(12) United States Patent
Mattox et al.

(10) Patent No.: US 11,260,333 B2
(45) Date of Patent: Mar. 1, 2022

(54) FILTRATION SYSTEM HOUSING WITH WAVE-SHAPED WALLS

(71) Applicant: Schenck Process LLC, Kansas City, MO (US)

(72) Inventors: Daniel James Mattox, Kansas City, MO (US); David Chilson, Kansas City, MO (US); Adam Clay Johnson, Kansas City, MO (US); Tyler Wright, Kansas City, MO (US)

(73) Assignee: Schenck Process LLC, Kansas City, MO (US)

( * ) Notice: Subject to any disclaimer, the term of this patent is extended or adjusted under 35 U.S.C. 154(b) by 254 days.

(21) Appl. No.: 16/679,816

(22) Filed: Nov. 11, 2019

(65) Prior Publication Data

US 2021/0138382 A1 May 13, 2021

(51) Int. Cl.
*B01D 46/00* (2006.01)
*B01D 46/44* (2006.01)
*B01D 46/24* (2006.01)
*B01D 46/04* (2006.01)

(52) U.S. Cl.
CPC ..... *B01D 46/0068* (2013.01); *B01D 46/0005* (2013.01); *B01D 46/04* (2013.01); *B01D 46/2411* (2013.01); *B01D 46/446* (2013.01); *B01D 2265/028* (2013.01)

(58) Field of Classification Search
CPC ...... B01D 46/02; B01D 46/023; B01D 46/04; B01D 46/0068; B01D 46/0002; B01D 46/0005; B01D 46/2411; B01D 46/446; B01D 2265/028
See application file for complete search history.

(56) References Cited

U.S. PATENT DOCUMENTS

| | | |
|---|---|---|
| 3,372,534 A | 3/1968 | Hysinger et al. |
| 2005/0229561 A1* | 10/2005 | Nepsund ............ B01D 46/4227 55/481 |
| 2017/0312676 A1* | 11/2017 | Brisebois ............. B01D 46/023 |

FOREIGN PATENT DOCUMENTS

EP 2408535 A1 1/2012

* cited by examiner

*Primary Examiner* — Robert Clemente
(74) *Attorney, Agent, or Firm* — Hovey Williams LLP (57) ABSTRACT

A filtration system housing is provided for supporting filtration system components. The filtration system is configured to remove particulates from air. The housing comprises a plurality of walls defining a chamber for receiving pressurized air. The housing additionally comprises a reinforcing member at least partially surrounding said walls. At least one of the walls is contoured to include a spatial curvature extending along a portion of the at least one wall.

19 Claims, 13 Drawing Sheets

FILTRATION SYSTEM HOUSING WITH WAVE-SHAPED WALLS

BACKGROUND

Filtration systems, such as baghouses, are often used in large, industrial dust collector systems for filtering and collecting dust, dirt, and other fine particulate from a particulate-laden air stream. Such filtration systems often comprise a housing in which one or more permeable bags or other filter elements are disposed between an inlet and an outlet. Pressurized air flows from the inlet, through the filter elements, and exits the housing via the outlet. The filter elements collect particulates as the air flows through the housing.

To effectively collect the particulates at industrial scale, a high volume of air must be pulled through the filtration system, which imposes high pressure on walls that form the housing of the filtration system. Such high pressure can lead to warping or other damage to the walls. Warping of the walls may form cracks or other unwanted openings in the housing, which can permit air and particulates to leak out from the housing. Such leakage results in inefficient filtering and potential external contamination. Damage to the walls under pressure may even cause the structural integrity of the housing and/or the filtration system to fail.

To reinforce the walls, vertical and/or horizontal ribs are often attached to the walls of the housing. Multiple ribs can be employed with each rib being welded to the walls. However, welding multiple ribs to a housing is time-consuming, labor-intensive, and often dangerous. The use of multiple ribs also increases costs associated with manufacturing, installation, maintenance, and repair of filtration systems.

The background discussion is intended to provide information related to the present invention which is not necessarily prior art.

SUMMARY

The present invention solves the above-described problems and other problems by providing a filtration system housing with stronger, more robust walls that require fewer reinforcing ribs.

A filtration system housing constructed in accordance with an embodiment of the present invention broadly comprises a plurality of walls defining a chamber and a reinforcing member. The filtration system is configured to remove particulates from air. The chamber is for receiving pressurized air. The reinforcing member at least partially surrounds the walls.

At least one of the walls comprises a spatial curvature, which may extend vertically along a portion of the wall. The spatial curvature of the wall contours the wall into a wave shape that yields a surprisingly increased strength of the housing so that fewer reinforcing members are required to achieve necessary pressure ratings.

Another embodiment of the invention is a method of forming a filtration system housing, wherein the filtration system is configured to remove particulates from air. The method broadly comprises forming a first wall having a first end and a second end; bending the first wall to form a spatial curvature extending between the first end and the second end; attaching the first wall to one or more secondary walls to define a chamber; and attaching a reinforcing member to the first wall and the secondary walls so that the reinforcing member is at least partially surrounding the first wall and the secondary walls.

Another embodiment of the invention is a filtration system housing comprising a plurality of walls defining a chamber for receiving pressurized air. Each of the walls is at least partially wave shaped so as to include a spatial curvature extending between ends of wall. Each of the walls bulges outwardly along the spatial curvature. The reinforcing member surrounds the walls and comprises a plurality of protrusions extending inwardly towards the walls and secured to outer surfaces of the walls.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
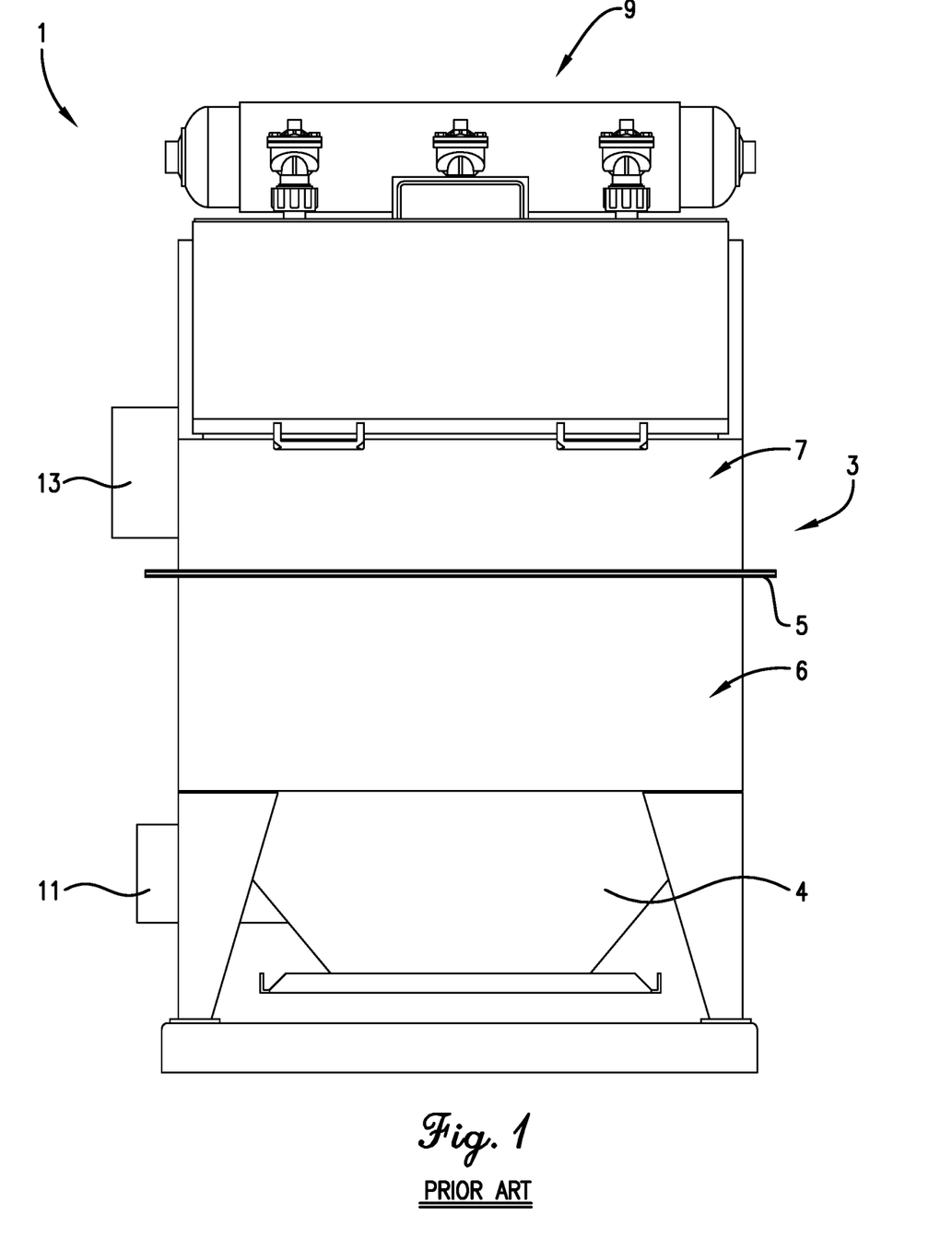
FIG. 1 is a front elevation view of a prior art filtration system.
Figure 2:
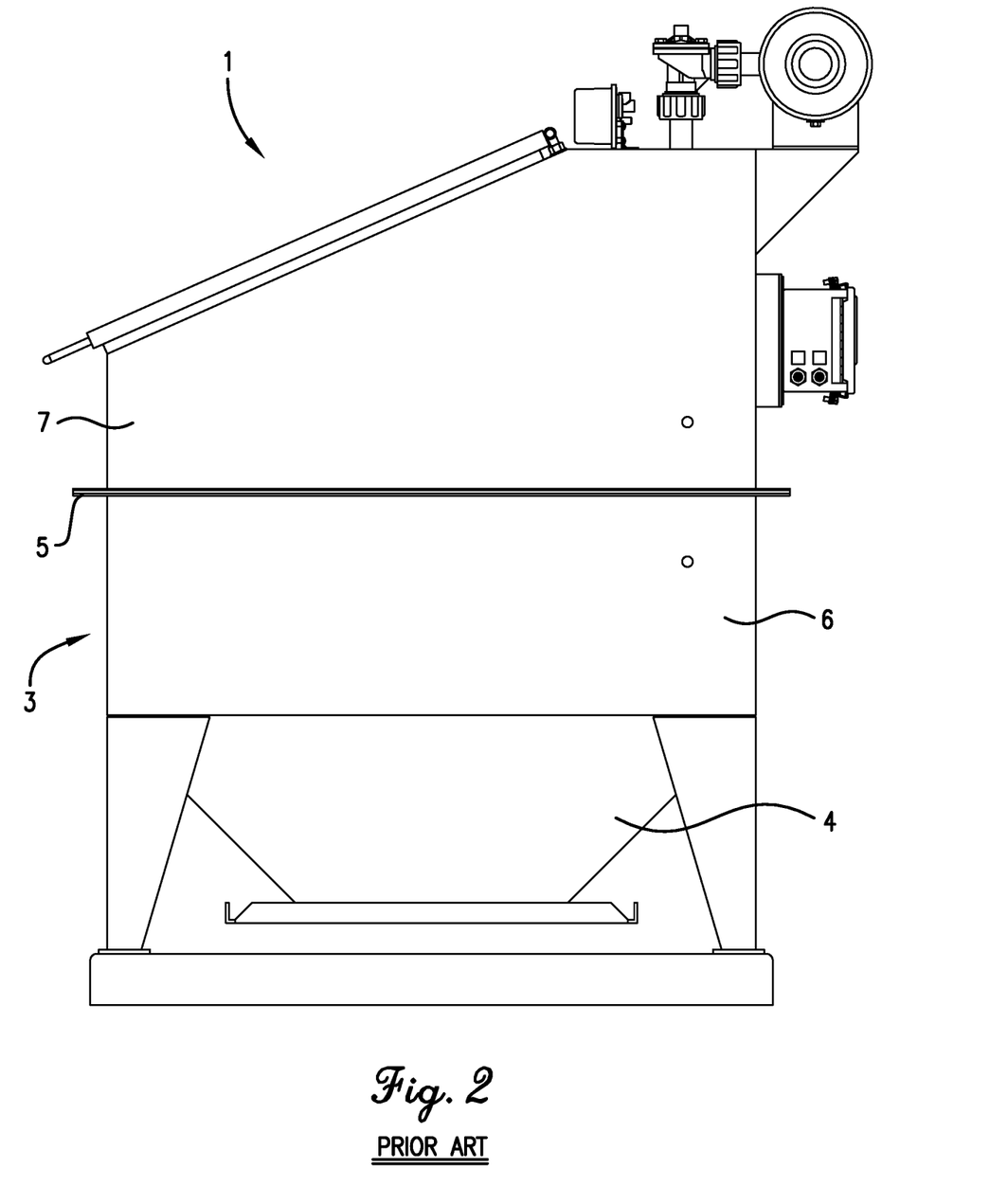
FIG. 2 is a side elevation view of the prior art filtration system of FIG. 1.

FIGS. 1 and 2 depict a filtration system 1 according to prior art teachings. The filtration system 1 is configured generally as baghouse comprising a housing 3 mounted on a base; a hopper 4 extending from below the housing 3 to collect dust or other particulates; a tube sheet 5 extending through the housing 3 and generally dividing the housing 3 into a lower, dirty air chamber 6 and an upper, clean air chamber 7; and at least one air filter cartridge, such as a bag filter (not shown), configured to be removably mounted in the tube sheet 5. The filtration system 1 is operable to receive air laden with dust, dirt, and other small and fine particulate in the housing 3. The dust is filtered from the air by passing through the air filter cartridges positioned within the tube sheet 5.

In more detail, as perhaps best illustrated in FIG. 1, particulate-laden air is provided to the lower, dirty air chamber 6 via an input 11. The air passes upwards through the housing 3 and through the air filter cartridges within the tube sheet 5 to filter the air. The filtered air exits the clean air chamber 7 of the housing 3 via an output 13. Ducts (not shown) may be secured to the input 11 and/or to the output 13 for transporting the dirty and clean air, respectively.

Turning to FIGS. 3-6, a filtration system housing 10 constructed in accordance with an embodiment of the present invention is illustrated. The housing 10 may form part of a baghouse-type filtration system for collecting and/or filtering particulates (e.g., dust) to remove such particulates from air. Such a baghouse-type filtration system may include one or more bag-type filters (or other filtering elements) for filtering the particulates from an air stream flowing through the housing 10. In some embodiments, the filters may be positioned within the housing 10. The housing 10 may be in fluid communication with air ducts, fans or pumps, hoppers, and/or storage containers. For instance, the housing 10 may include an inlet/input for receiving particulate-laden air, and an outlet/output for removing filtered air. The fans or pumps may force pressurized air to flow into and out of the housing 10 via the respective inlets and outlets.

Broadly, the housing 10 may comprise a plurality of walls 12, 14, 16, 18 and one or more reinforcing members 20 extending around the walls 12, 14, 16, 18. The walls 12, 14, 16, 18 may collectively define a chamber 22 for receiving pressurized air, for supporting the filters, and/or for facilitating airflow through the chamber 22 and the filters. The walls 12, 14, 16, 18 may present a top opening 24 and a bottom opening 26, which may respectively define a top and a bottom of the chamber 22. In certain embodiments, additional component of the filtration system may be connected to tops and bottoms of the walls 12, 14, 16, 18, as will be discussed in more detail below.

The walls 12, 14, 16, 18 may be connected (e.g., via weld) to each other along adjacent side edges so that the walls 12, 14, 16, 18 are sealed together except for the openings 24, 26. In some alternatives, the walls 12, 14, 16, 18 may be formed as an integral unit. The walls 12, 14, 16, 18 may be made of any number of rigid materials, such as sheet metal. The walls 12, 14, 16, 18 may, in some embodiments, form a rectangular parallelepiped. However, the housing 10 may have any number of walls and may form any prismatic shape without departing from the scope of the present invention. The housing 10 may, in some embodiments, also be cylindrical and formed from a single, cylindrically-shaped wall.

Figure 3:
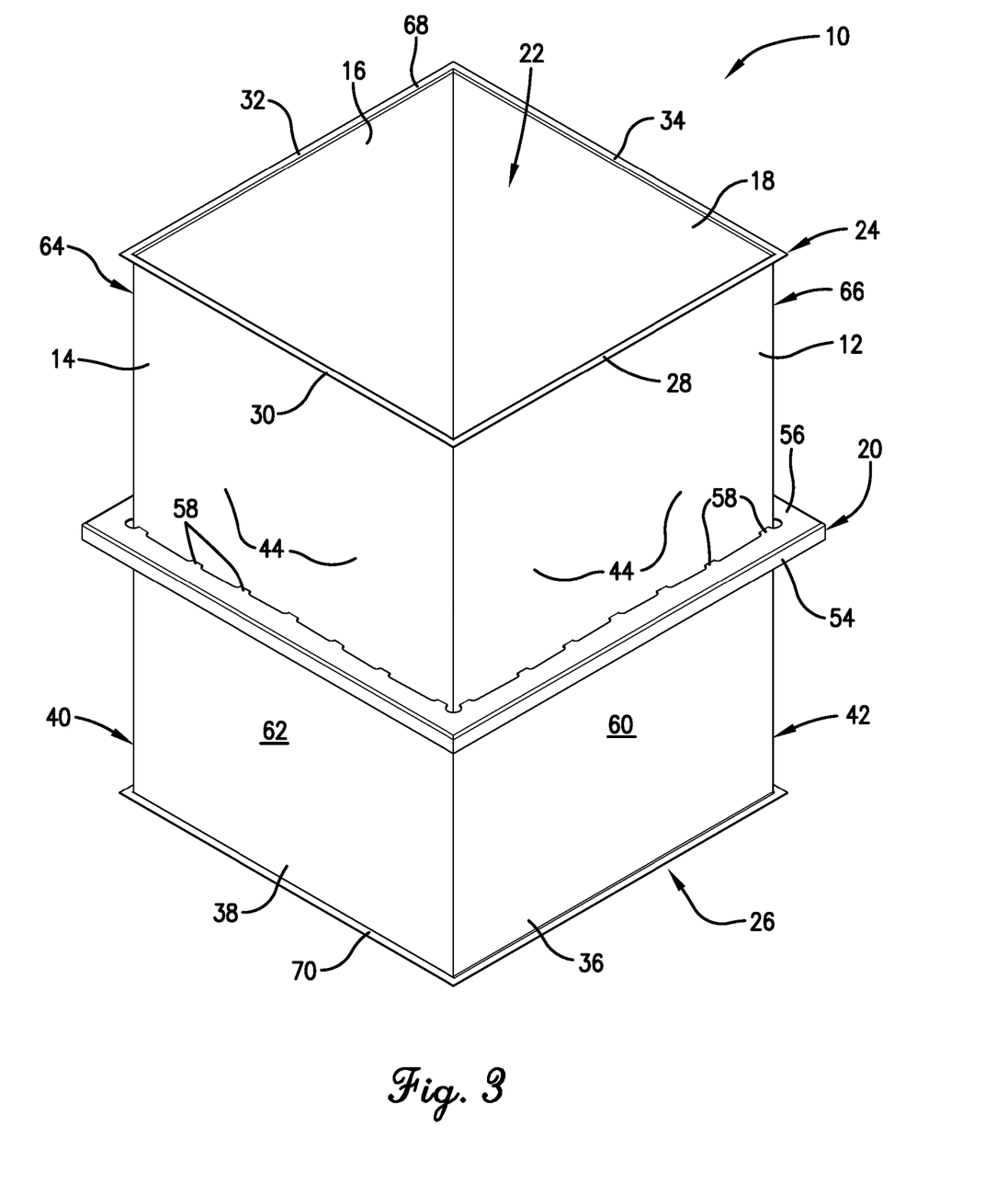
FIG. 3 is an elevated perspective view of a filtration system housing constructed in accordance with embodiments of the present invention.
Figure 4:
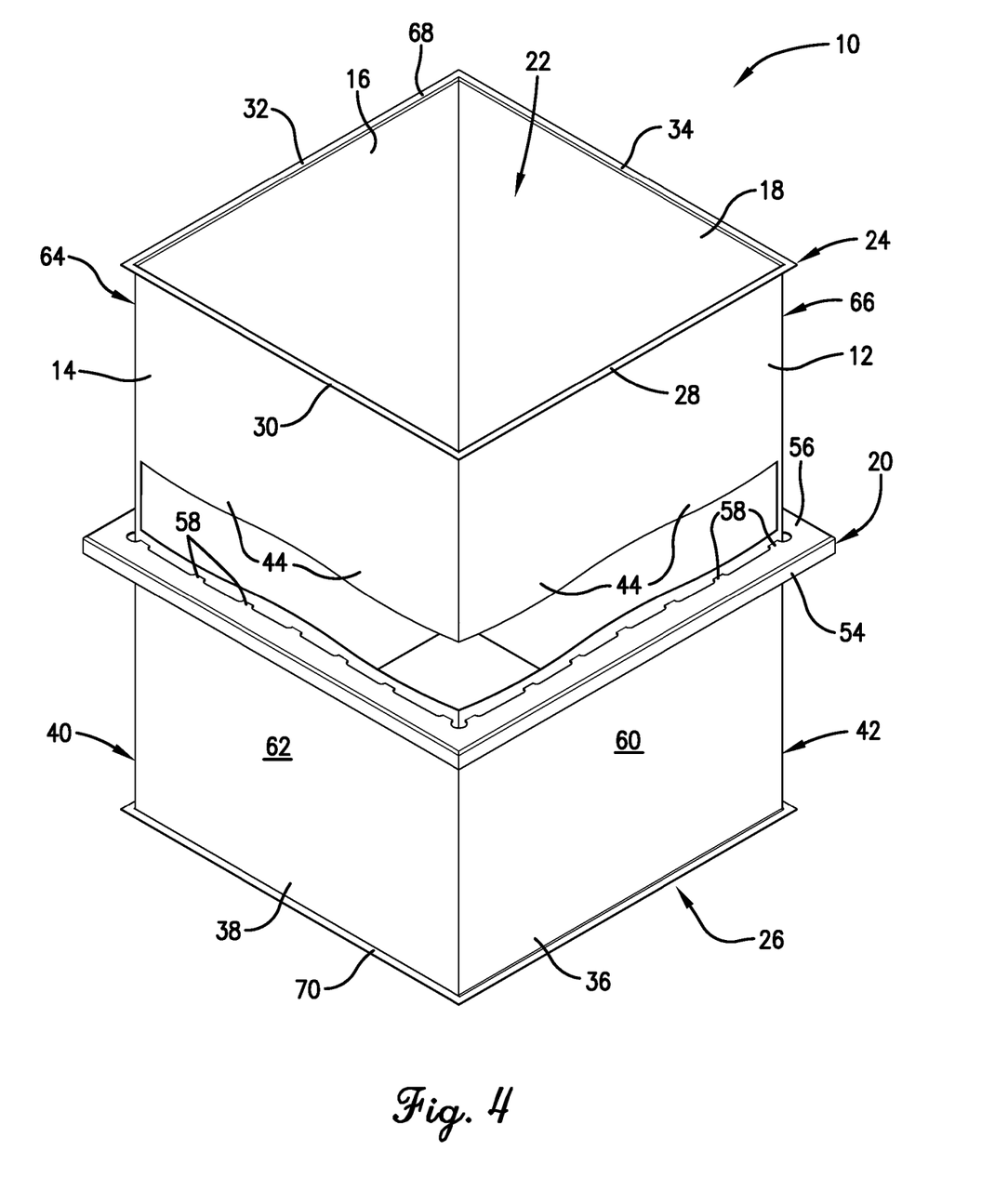
FIG. 4 is an elevated perspective view of the filtration system housing of FIG. 3 with a portion cut away to illustrate walls having one or more ridges or spatial curvatures to provide the walls with a wave shape.
Figure 5:
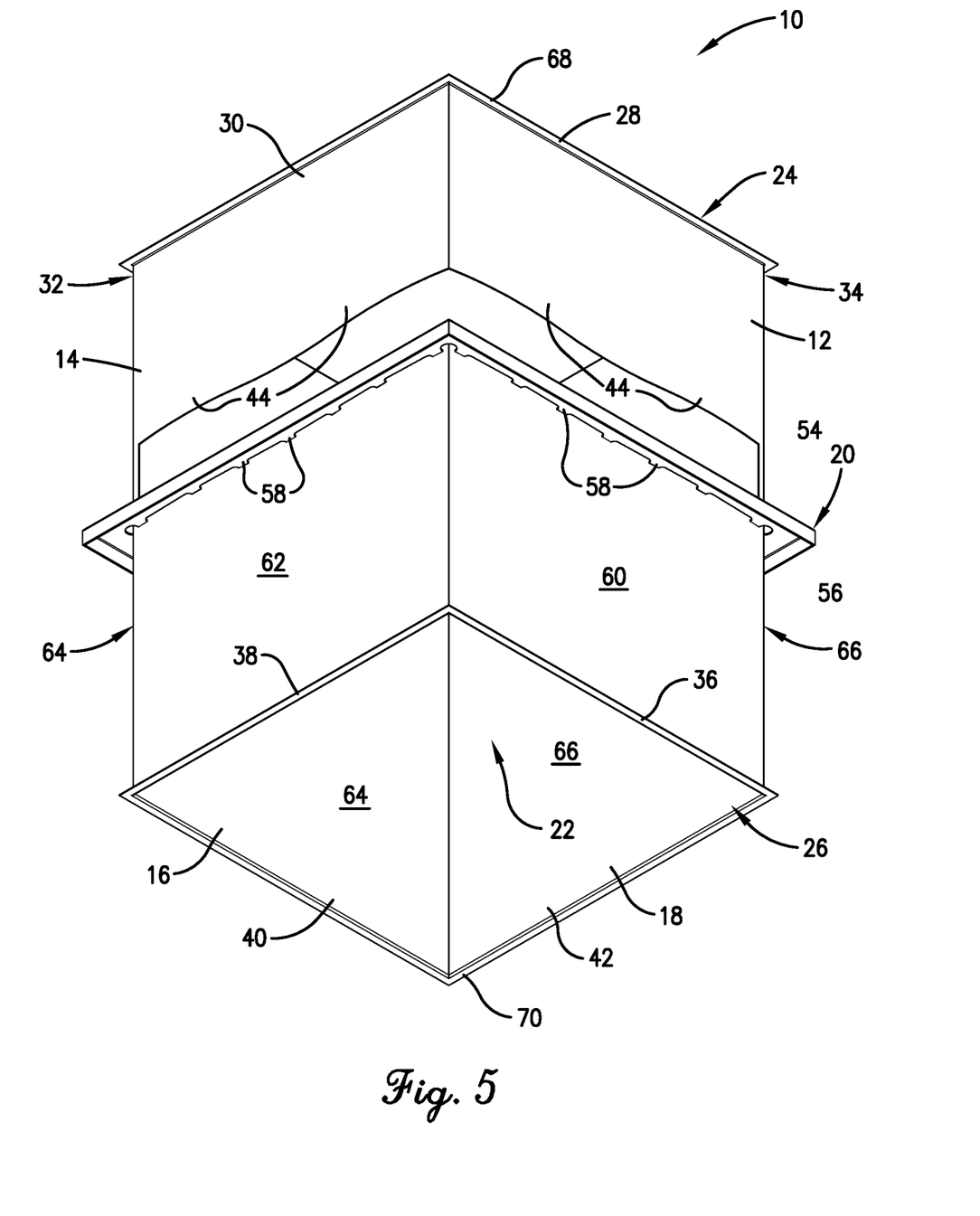
FIG. 5 is a lowered perspective view of the filtration system housing of FIG. 4
Figure 6:
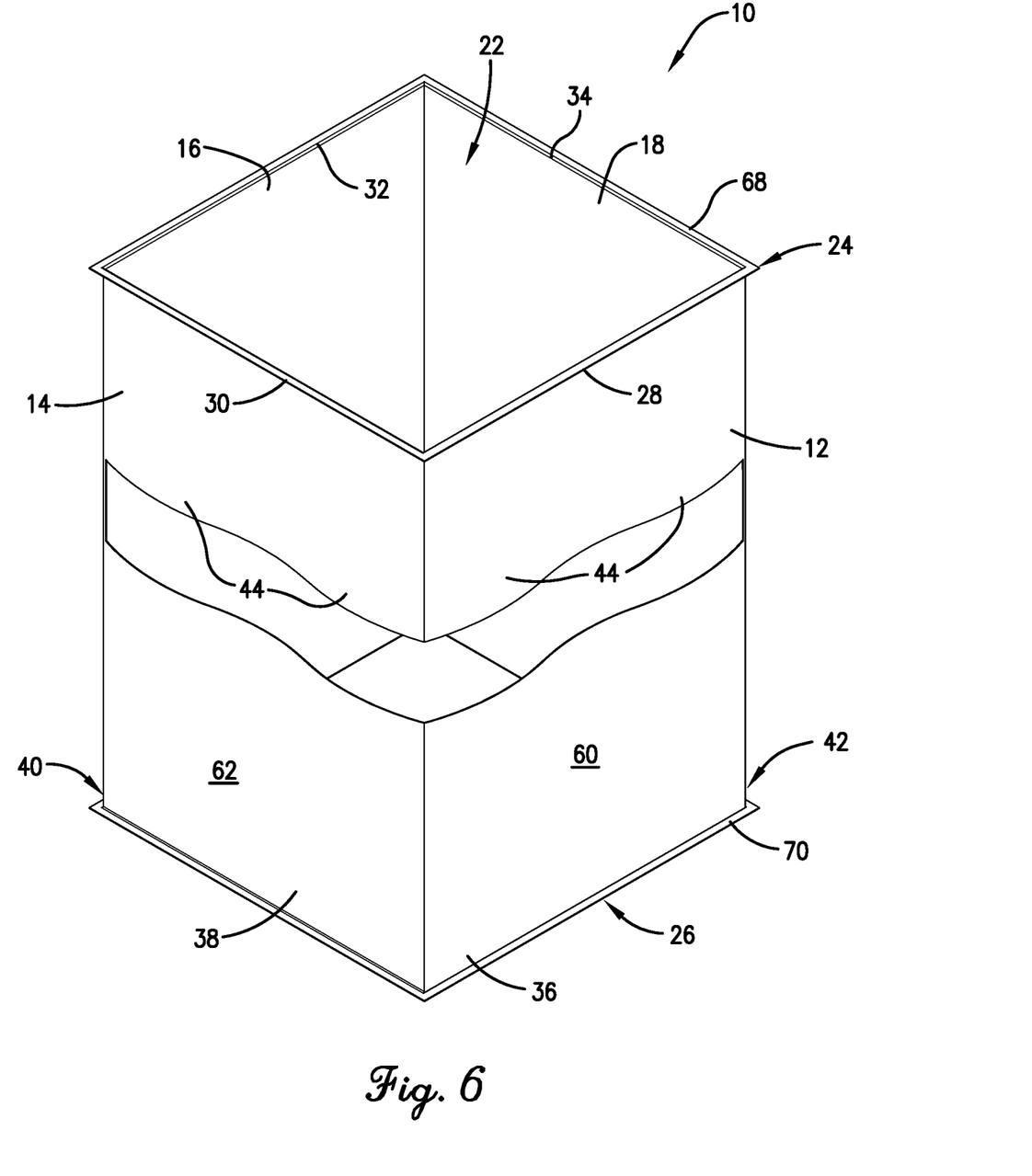
FIG. 6 is a perspective view of the filtration system housing of FIG. 4 with a reinforcing member removed.

As illustrated in FIGS. 3-6, the walls 12, 14, 16, 18 may each comprise a sheet of relatively thin, yet strong material, such as sheet metal (e.g., aluminum, steel, etc.). In some embodiments, the walls 12, 14, 16, 18 may be generally rectangular so as to respectively include first ends 28, 30, 32, 34 and second ends 36, 38, 40, 42. In certain embodiments, the walls 12, 14, 16, 18 may be cut into rectangular sections from a larger section of material by way of mechanical or laser cutters. In some embodiments, each of the walls 12, 14, 16, 18 may also be at least partly curved in the form of a wave, such that the walls 12, 14, 16, 18 have a wave-like shape. As perhaps best illustrated in FIGS. 4-6, to form the wave-like shape, the walls 12, 14, 16, 18 may be formed to at least partially include a three-dimensional curved surface or a spatial curvature formed, for example, as one or more vertically extending ridges 44 extending at least partly between the first end 28, 30, 32, 34 and second end 36, 38, 40, 42. FIGS. 4-6 have portions of the walls 12, 14, 16, 18 cut away to better depict the one or more ridges 44, which can give the walls 12, 14, 16, 18 the curved, wave-like shape.

The first ends 28, 30, 32, 34 the walls 12, 14, 16, 18 may be top ends, and the second ends 36, 38, 40, 42 may be bottom ends. The portions of the walls 12, 14, 16, 18 at or adjacent to the first ends 28, 30, 32, 34 and the second ends 36, 38, 40, 42 may be generally flat. In contrast, the portion of the walls 12, 14, 16, 18 extending between the first ends 28, 30, 32, 34 and the second ends 36, 38, 40, 42 may be generally wave shaped, as provided by the presence of the ridges 44 extending between the first ends 28, 30, 32, 34 and second ends 36, 38, 40, 42.

Figure 7:
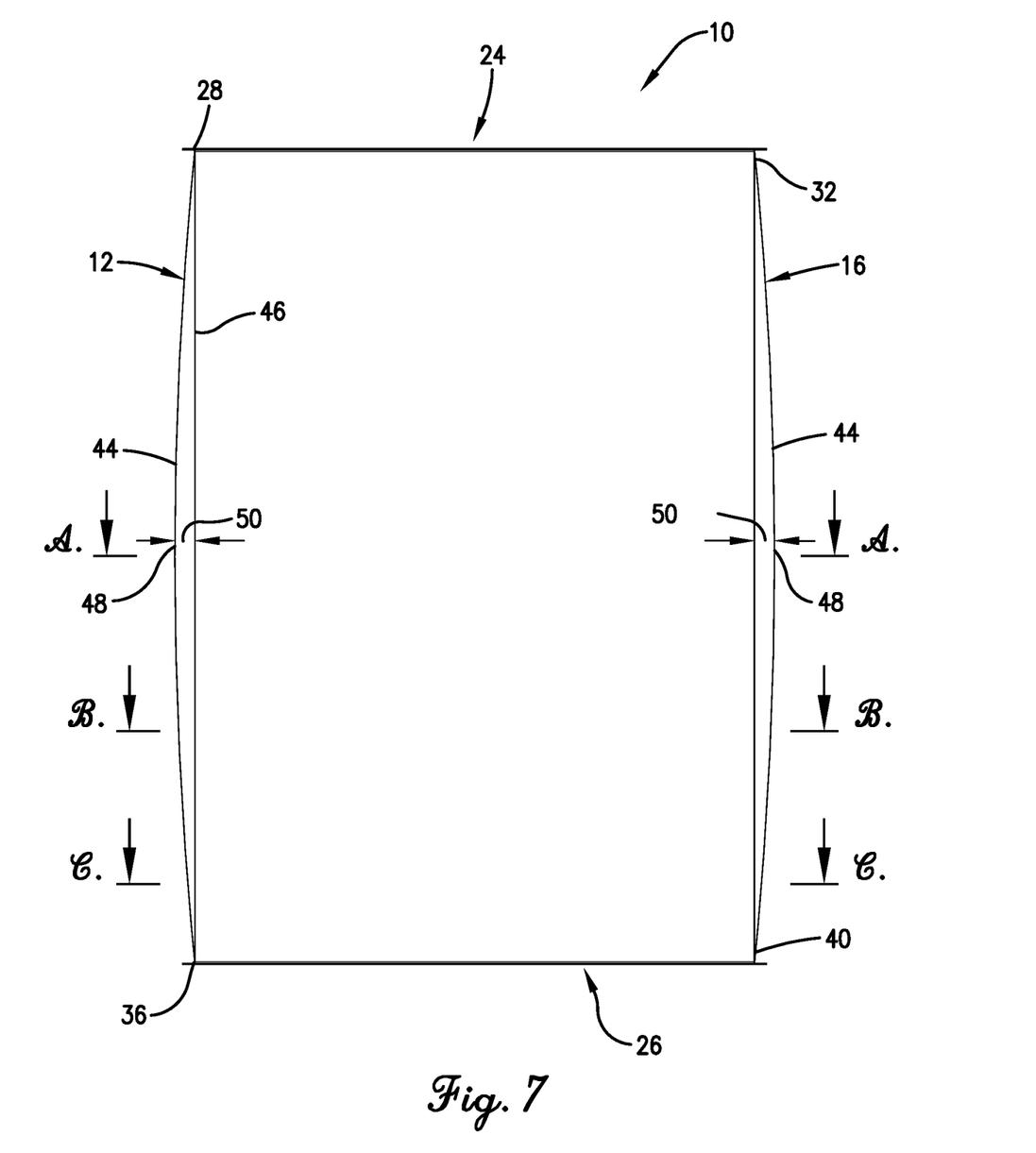
FIG. 7 is a side elevation view of the filtration system housing of FIG. 3 with a reinforcing member removed.

As perhaps best illustrated by FIG. 7, the ridges 44 of the walls 12, 14, 16, 18 may progressively bulge laterally or radially outward away from remaining portions of the walls 12, 14, 16, 18 as the ridges 44 extend downward, away from the generally flat first ends 28, 30, 32, 34. The ridges 44 may generally have a maximum outward bulge near a midway point between the first ends 28, 30, 32, 34 and second ends 36, 38, 40, 42 (i.e., a midway point of a height of the walls 12, 14, 16, 18). Correspondingly, the ridges 44 may progressively retract or flatten as the ridges 44 extend from the middle of the walls 12, 14, 16, 18 towards the generally flat second ends 36, 38, 40, 42.

Figure 7A:
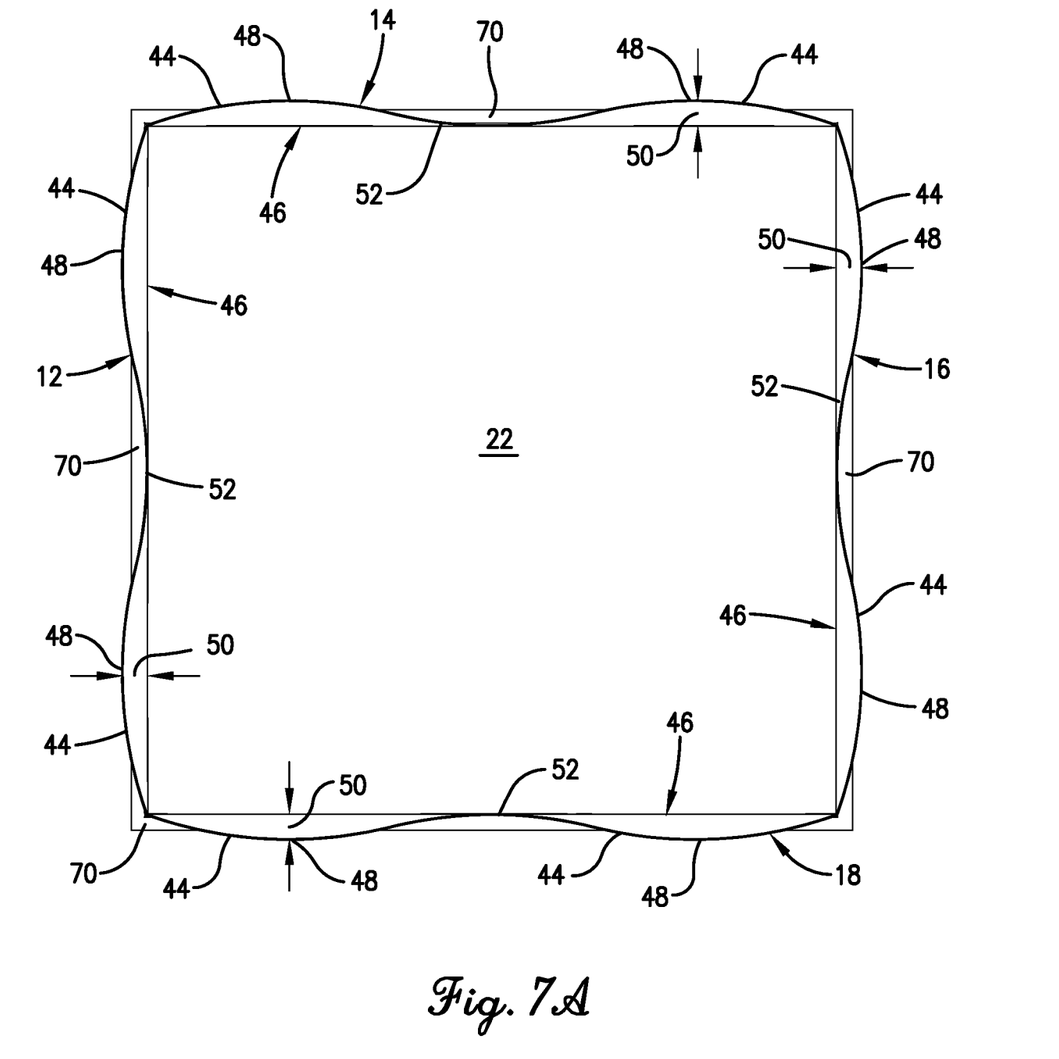
FIG. 7A is a cross section taken along the line A-A of the filtration system housing of FIG. 7.
Figure 7B:
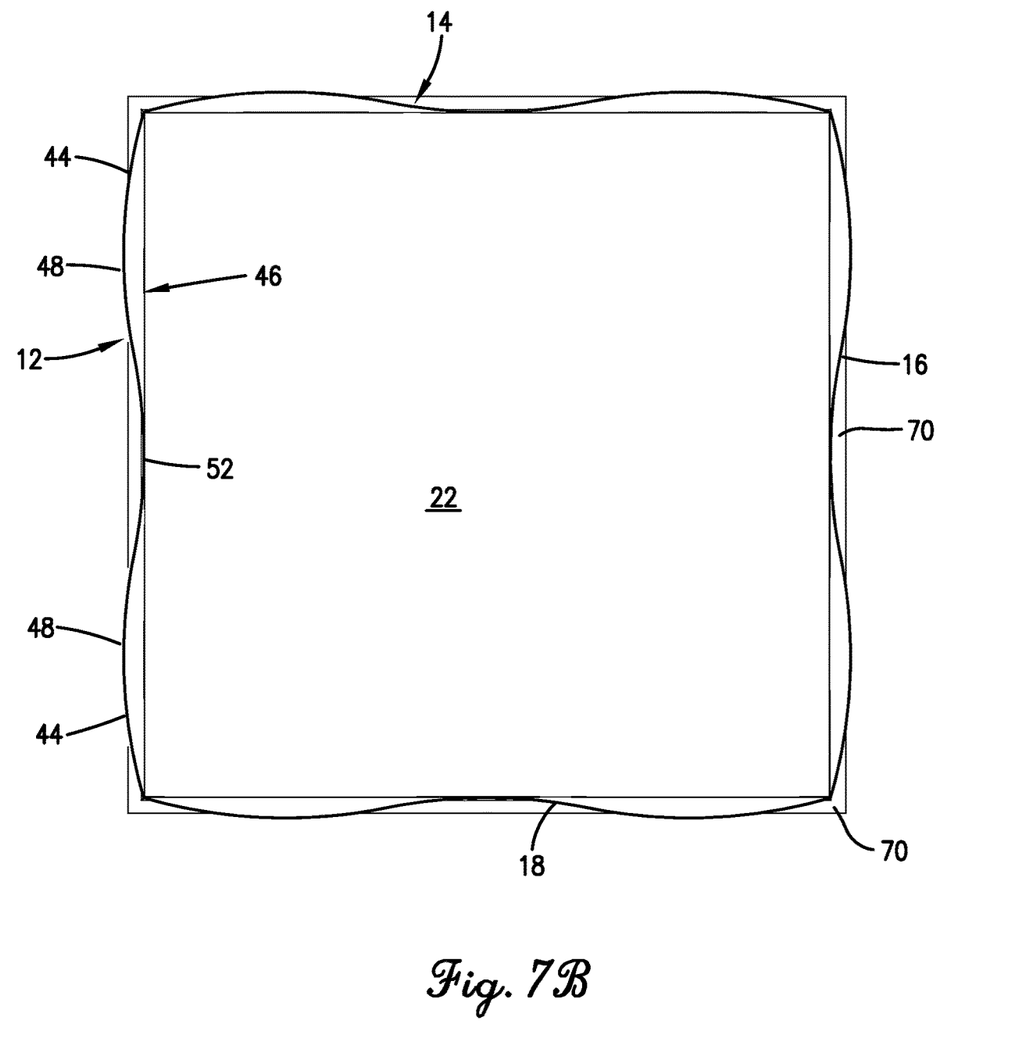
FIG. 7B is a cross section taken along the line B-B of the filtration system housing of FIG. 7.
Figure 7C:
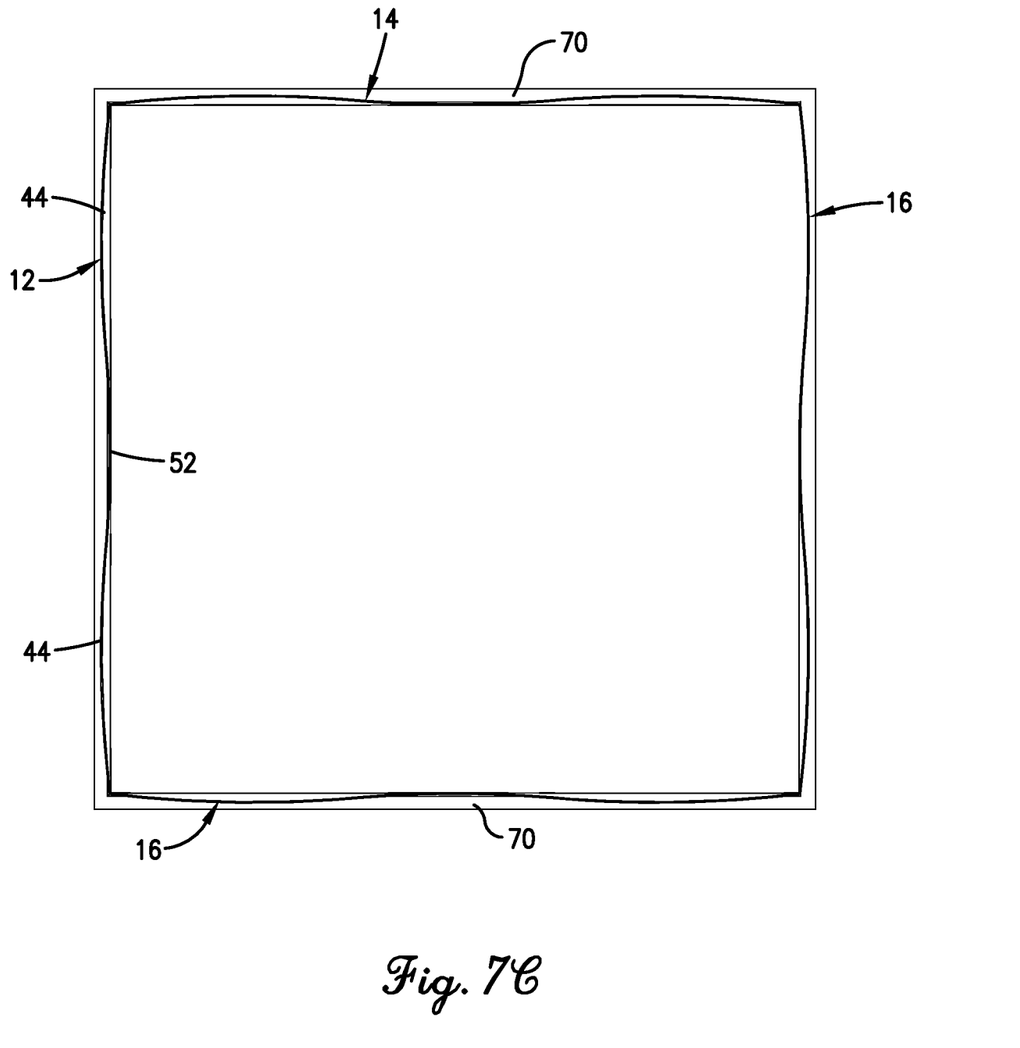
FIG. 7C is a cross section taken along the line C-C of the filtration system housing of FIG. 7.

As perhaps best illustrated by FIGS. 7A-7C, the cross-section of the walls 12, 14, 16, 18 through ridges 44 may preferably be formed as rounded arcs, though they may have any number of shapes without departing from the scope of the present invention. In some embodiments, as shown in FIG. 7, the ridges 44 protrude outwardly away from a theoretical flat, vertical plane 46 extending between the first ends 28 and the second ends 36 of the walls 12, 14, 16, 18. The vertical plane 46 may perhaps align with corner edges of adjacent and adjoined walls 12, 14, 16, 18. The ridges 44 may bulge laterally or radially outwardly from the theoretical plane 46 so that the ridges 44 provide the walls 12, 14, 16, 18 with spatial curvature or a three-dimensional curved surface. In particular, the walls 12, 14, 16, 18 may originally be formed from a flat, generally two-dimensional piece of sheet metal. However, as will be discussed in more detail below, the walls 12, 14, 16, 18 may be manipulated (e.g., machined) to form one or more bulging ridges 42 along at least a portion of the walls 12, 14, 16, 18, such that the walls are shaped as a three-dimensional curved surface (e.g., a wave shape) and/or such that the walls have a spatial curvature. Given the outward bulging of the ridges 42 from the theoretical plane 46, the ridges 42 form crests with apexes or vertices 48 at the midway point between the first ends 28, 30, 32, 34 and second ends 36, 38, 40, 42. However, the vertices 48 of the ridges 44 may be located at other positions along the walls 12, 14, 16, 18 without departing from the scope of the present invention. The ridges 44 may extend a distance 50 between the vertices 48 and their corresponding theoretical plane 46, as illustrated in FIG. 7.

Each wall 12, 14, 16, 18 may have any number of ridges 44 without departing from the scope of the present invention. For example, as depicted in FIGS. 7A, 7B, and 7C, the walls 12, 14, 16, 18 may have two ridges 44, resulting in the formation of a trough 52 located between the two ridges 44. In some embodiments, a portion of the trough 52 may extend through the theoretical plane 46, be in contact with the plane 46, and/or be a distance away from the plane 46. For example, a base (or innermost portion) of the trough 52 may be aligned with the theoretical plane 46 (See, e.g., FIG. 7A). As depicted in FIGS. 7A, 7B, 7C, 7D, a cross-sectional view of the ridges 44 of the walls 12, 14, 16, 18 illustrate how the walls 12, 14, 16, 18 can be formed in a substantially sinusoidal wave shape. Depending on the height of where the cross-sectional view is taken through the housing 10, the amplitude of the presented sinusoidal wave changes. For example, the ridges 44 extend or bulge outwardly to a greater extent in FIG. 7A, which is a cross-sectional view taken at a position adjacent to (or at) the midway point between the first ends 28, 30, 32, 34 and second ends 36, 38, 40, 42 (i.e., near the middle of the walls 12, 14, 16, 18) In FIG. 7b, the ridges 44 extend or bulge outwardly to a lesser extent, as the cross-sectional view is taken at a position between the midway point of the walls 12, 14, 16, 18 and the lower, second end 36, 38, 40, 42. Finally, the ridges 44 extend or bulge outwardly to a minimal extent in FIG. 7C, which is a cross-sectional view taken at a position adjacent the lower, second end 36, 38, 40, 42 of the of the walls 12, 14, 16, 18. As was noted previously, in some embodiments, the first end 28, 30, 32, 34 and the second end 36, 38, 40, 42 of the walls 12, 14, 16, 18 may be generally flat. Stated differently, as the cross-section approaches the midway point of the height of the walls 12, 14, 16, 18, the amplitude of the sinusoidal wave will grow such that the ridges 44 bulge away furthest from the theoretical plane 46 at the midway point.

Returning to FIGS. 3-5, the housing 10 may include the reinforcing member 20, which is configured to strengthen the housing 10 extending around the walls 12, 14, 16, 18 to hold the walls 12, 14, 16, 18 securely together. The reinforcing member 20 may be formed from metal material (e.g., sheet metal and/or structural steel members). The reinforcing member 20 may at least partially surround the walls 12, 14, 16, 18 and may be attached to the walls 12, 14, 16, 18 (e.g., via welding) at a location between their first ends 28, 30, 32, 34 and their second ends 36, 38, 40, 42. In some embodiments, the reinforcing member 20 may be attached to the walls 12, 14, 16, 18 at or adjacent to the midway point between the ends of the walls and/or along the vertices 48 of the ridges 44 of the walls 12, 14, 16, 18.

The reinforcing member 20 may comprise a vertical frame element 54 and a horizontal flange 56 extending away from the frame element 54. The frame element 54 may at least partially surrounds the walls 12, 14, 16, 18 with a gap being presented between the frame element 54 and the walls 12, 14, 16, 18. The frame element 54 may present a perimeter that completely surrounds the walls 12, 14, 16, 18. In some embodiments, the frame element 54 may have the same number of sides as the number of walls 12, 14, 16, 18.

The flange 56 of the reinforcing member 20 may extend from an inner surface of the frame element 54 toward the walls 12, 14, 16, 18. The flange 56 may be formed with one or more tabs or protrusions 58 that extend inwardly toward the walls 12, 14, 16, 18 and are configured to be secured (e.g., via weld) to outer surfaces 60, 62, 64, 66 of the walls 12, 14, 16, 18, thereby securely connecting the reinforcing member 20 to the walls 12, 14, 16, 18. However, in some embodiments, the reinforcing member 20 may be formed without protrusions. Regardless, the positions of the protrusions 58 may be configured to present weld locations between the reinforcing member 20 and the walls 12, 14, 16, 18. In some embodiments, the particular configuration of protrusions 58 may be selected so as to minimize the number of weld locations required to secure the reinforcing member 20 to the walls 12, 14, 16, 18. In some embodiments, the protrusions 58 may be tapered at their ends so that the flange 56 is scallop shaped. In such embodiments, only the tapered ends of the protrusions 58 may need to be welded to the walls 12, 14, 16, 18.

In some embodiments, the reinforcing member 20 may be contoured so that a portion of the reinforcing member 20 is aligned with the ridges 44 and/or troughs 52 of the walls 12, 14, 16, 18. For example, the lengths (or inward extensions) of the protrusions 58 may vary so that the protrusions 58 make contact with walls 12, 14, 16, 18 at the ridges 44 and/or the troughs 52. The frame 54 and/or flange 56 of the reinforcing member 20 may also be bent and/or cut so that the reinforcing member 20 includes protrusions 58 that form have ridges and/or troughs that match or correspond with the ridges 44 and/or troughs 52 of the walls 12, 14, 16, 18.

While the figures depict the housing 10 having one reinforcing member 20, the housing 10 may have any number of reinforcing members 20 without departing from the scope of the present invention. In some embodiments, the housing 10 may not have any reinforcing members 20.

In some embodiments, as shown in FIG. 3, the housing 10 may include one or more flanges 68, 70 attached to the first ends 28, 30, 32, 34 and/or second ends 36, 38, 40, 42 of the walls 12, 14, 16, 18. The flanges 68, 70 may be provided for connecting the housing 10 to ducts, hoppers, manifolds, or other components of the filtration system.

The filtration system housing 10 described above provides various benefits over prior art filtration system, such as the prior art filtration system 1 shown in FIGS. 1 and 2. For example, the wave shape of the walls 12, 14, 16, 18 (i.e., curved walls with the presence of one or more ridges 44 and/or troughs 52) provides for the housing 10 to have improved positive and vacuum pressure ratings over filtration system housings with generally flat walls. For example, Applicant has found that the housing 10 of embodiments of the present invention provides a positive pressure strength at least 50%, at least 60%, at least 70%, at least 75%, at least 80%, at least 90%, at least 100%, at least 110%, at least 120%, at least 130%, or at least 140% greater than that of prior art filtration system housings (e.g., the prior art filtration system housing shown in FIGS. 1 and 2). In addition, Applicant has found that the housing 10 of embodiments of the present invention provides a negative pressure strength at least 50%, at least 60%, at least 70%, at least 80%, at least 75%, at least 90%, at least 100%, at least 110%, at least 120%, at least 130%, or at least 140% greater than that of prior art filtration system housings (e.g., the prior art filtration system housing shown in FIGS. 1 and 2). As specific examples, the housing 10 formed according to embodiments of the present invention is configured to achieve a positive pressure rating of (i.e., is configured to withstand a positive pressure of) at least 2.5, at least 2.8, at least 3.0, at least 3.1, at least 3.3, at least 3.5, at least 3.7, at least 3.9, at least 4.0, at least 4.1, or at least 4.2 pounds per square inch as measured by a gauge (psig). In contrast, prior art filtration system housings, such as that illustrated in FIGS. 1 and 2, would generally provide a positive pressure rating of around 1.75 psi. As a further example, the housing 10 formed according to embodiments of the present invention is configured to achieve a negative pressure rating of (i.e., is configured to withstand a negative pressure of) at least 0.8, at least 0.85, at least 0.9, at least 0.95, at least 1.00, at least 1.05, at least 1.08, at least 1.1, at least 1.15, at least 1.2, at least 1.25, at least 1.3, at least 1.35, or at least 1.4 pounds per square inch as measured by a gauge (psig). In contrast, prior art filtration system housing, such as that illustrated in FIGS. 1 and 2, would generally provide a negative pressure rating of around 0.6 psi.

The increased strength of the inventive filtration system housing 10, as provided by the wave-shaped walls, also requires fewer reinforcing members (e.g., reinforcing members 20) to be used when constructing the housing 10. By reducing the need for additional reinforcing members, the present invention reduces the amount of material and the amount of welding needed to form the housing 10. For example, Applicants have found that the present invention filtration system housing 10 can be manufactured using at least 20%, at least 25%, at least 30%, at least 35%, or at least 40% less welding than prior art filtration system housings. In addition, the protrusions 58 of the reinforcing member 20 can aid in reducing the amount of welding and raw material within the housing 10 without sacrificing the integrity and strength of the housing 10. Specifically, in some embodiments, the housing 10 may be manufactured by only securing the reinforcing member 20 to the walls 12, 14, 16, 18, at the points where the protrusions 58 contact the walls 12, 14, 16, 18. As such, the overall amount welding needed to manufacture the housing 10 can be reduced.

To manufacture the housing 10, each of the walls 12, 14, 16, 18 may be secured together to form a generally rectangular shape enclosing the chamber 22. In some embodiments, each of walls 12, 14, 16, 18 may be formed into a wave shape prior to being secured together. For example, the walls 12, 14, 16, 18 may originally be formed as a flat, rectangular piece of sheet metal (e.g., cut from a larger section or roll of sheet metal). The flat sheet metal may then be formed into a wave shape (i.e., so as to include the one or more ridges 44) mechanically, such as via a brake press, a mechanical roller, or the like. Specifically, the sheet metal may be manipulated from the generally flat, two-dimensional piece of material into a piece of material with a spatial curvature (i.e., a three-dimensional curved surface). The flat sheet metal may also be formed into a wave shape by compressing the lateral sides of the sheets inward (e.g., via a mechanical press and/or manually by a metal fabricator), so as to create the wave shape. The flat sheet metal may also be formed into a wave shape by pulling the lateral sides of the sheets outward (e.g., via a mechanical press and/or manually by a metal fabricator), so as to create the wave shape. Alternatively, the flat sheet metal may be formed into a wave shape (i.e., so as to include the one or more ridges 44) by hanging or orientating the flat sheets to allow gravity to bend the sheets into the wave shape. In further alternatives, the walls 12, 14, 16, 18 may be formed into wave shapes after the walls 12, 14, 16, 18 are secured together. In such embodiments, the walls 12, 14, 16, 18 may deformed (e.g., pushed, pulled, or otherwise moved by a metal fabricator) into the appropriate wave shape, at which point the walls 12, 14, 16, 18 can be secured (e.g., welded) to the reinforcing member 20 to hold the walls 12, 14, 16, 18 in the wave shape.

Figure 8:
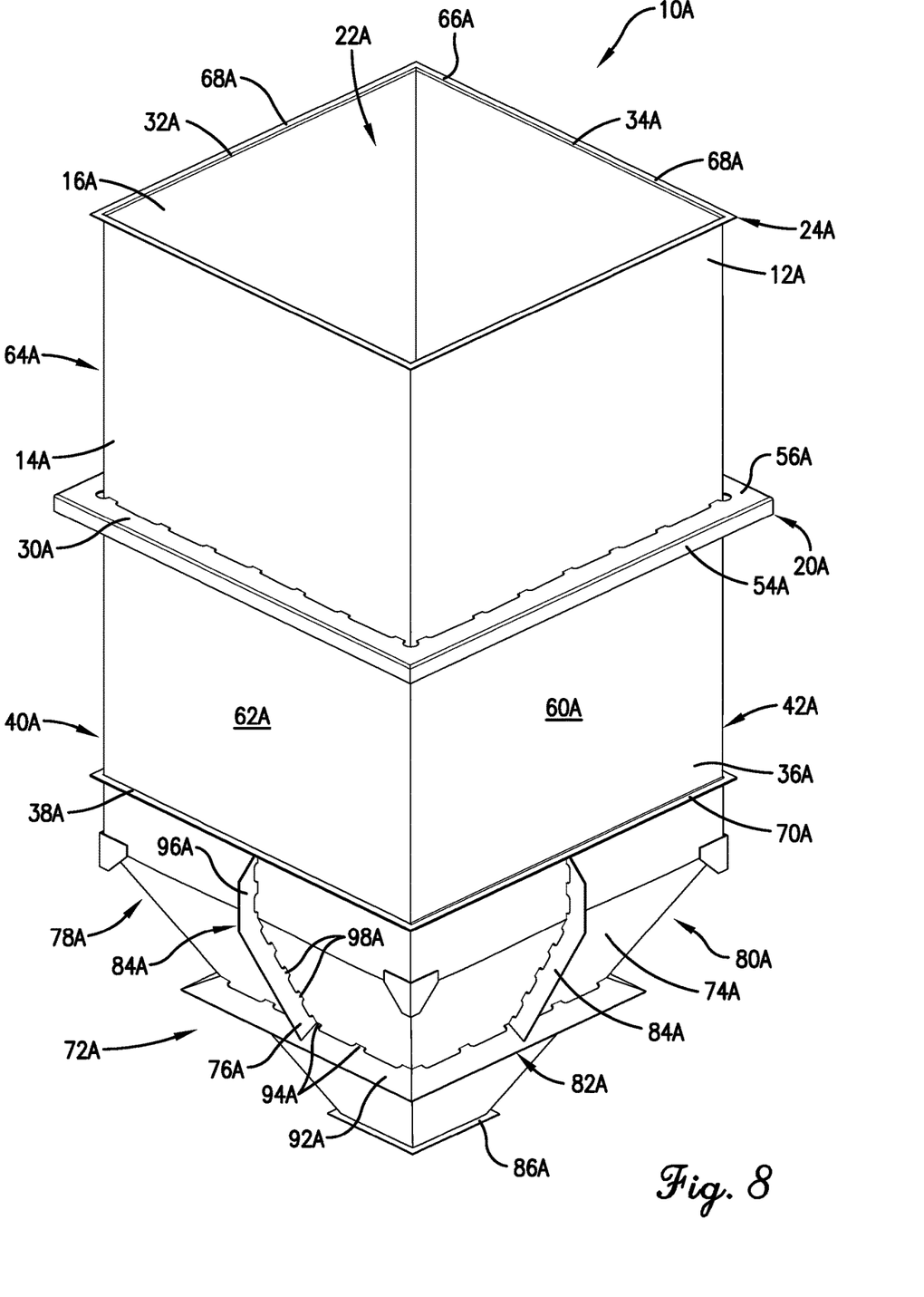
FIG. 8 is an elevated perspective view of a filtration system housing constructed in accordance with another embodiment of the present invention and including a hopper.

An additional filtration system housing 10A, which may be in the form of a baghouse, is constructed in accordance with embodiments of the present invention and is shown in FIG. 8. The housing 10A may comprise certain similar components as housing 10; thus, components of housing 10A that correspond to similar components in housing 10 will share common reference numerals but will have the letter 'A' appended thereto.

In general, the housing 10A may be substantially similar to housing 10 but may further include a hopper 72A attached to the walls 12A, 14A, 16A, 18A at the bottom of the housing 10A (i.e., attached at the bottom or second end of the housing 10A). The hopper 72A may be configured to collect particulate matter that is filtered from the air flowing through the housing 10A. The hopper 72A may further guide the collected particulates into a separate container and/or to a duct. The hopper 72A broadly comprises a plurality of walls 74A, 76A, 78A, 80A, (e.g., four walls), one or more horizontal reinforcing members 82A, and one or more vertical reinforcing members 84A. In some embodiments, the hopper 72A may be formed without horizontal reinforcing members 82A and vertical reinforcing members 84A, or may be formed with either horizontal reinforcing members 82A or vertical reinforcing members 84A.

The walls 74A, 76A, 78A, 80A of the hopper 72A may be connected to the walls 12A, 14A, 16A, 18A so as to configured to guide particulate matter into a separate container and/or duct. The connection between walls 74A, 76A, 78A, 80A and walls 12A, 14A, 16A, 18A may be airtight (e.g., via welding). The walls 74A, 76A, 78A, 80A of the hopper 72A may be connected to flange 70A at the bottom of the walls 12A, 14A, 16A, 18A. The hopper 72A may additionally include a flange 86A at a bottom end of the walls 74A, 76A, 78A, 80A for connecting the hopper 72A with other components (e.g., containers or ducts). The walls 74A, 76A, 78A, 80A may extend down a length and then may bend or angle inwards and so as to be tapered, thereby defining a funnel-shaped passage.

Figure 9:
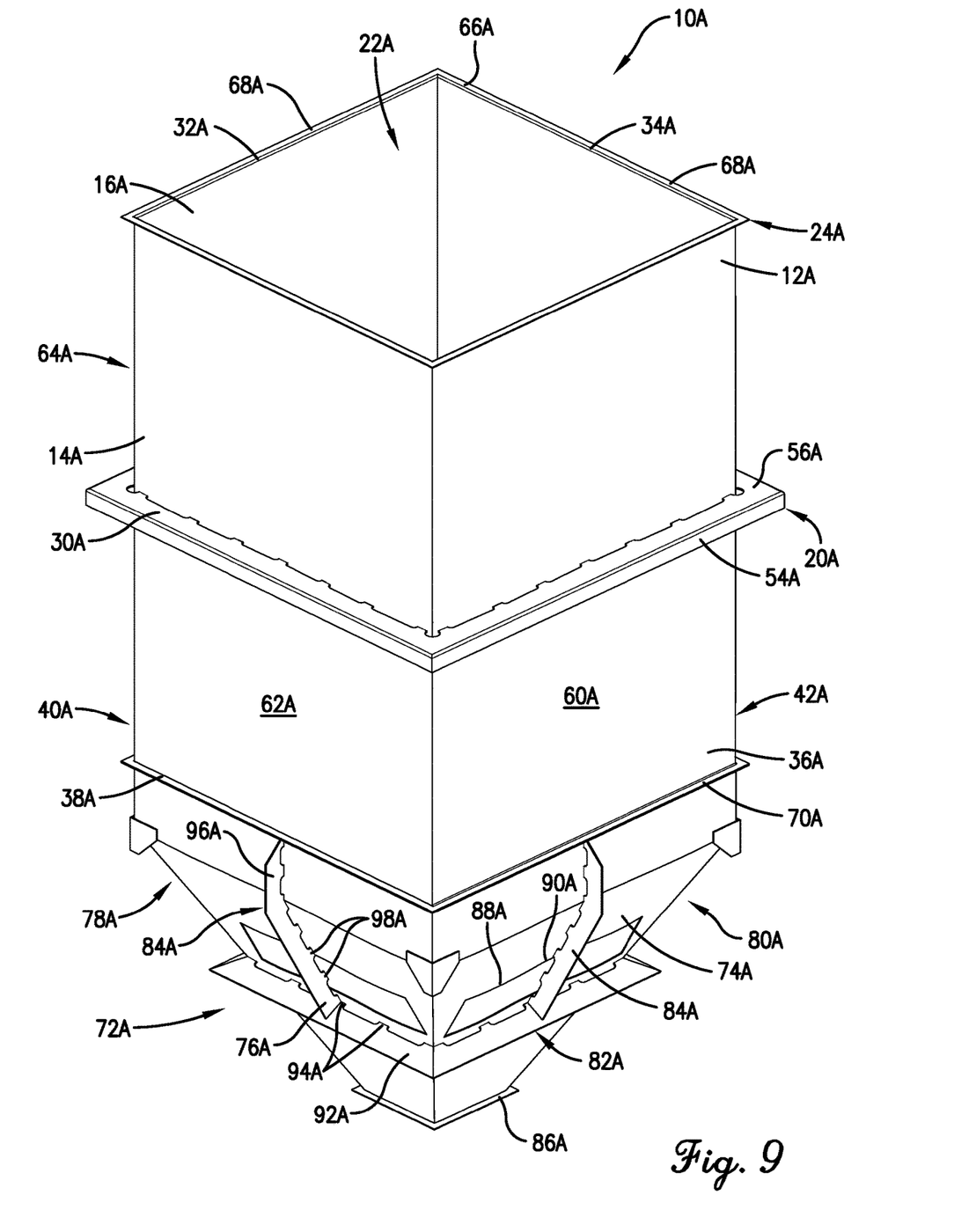
FIG. 9 is an elevated perspective view of the filtration system from FIG. 8, with a portion of the hopper cut away to illustrate walls of the hopper having one or more spatial curvatures to provide the walls with a wave shape.

Similar to walls 12A, 14A, 16A, 18A, the walls 74A, 76A, 78A, 80A of the hopper 72A may be curved into a wave shaped. FIG. 9 depicts a portion of the hopper 72A cut away to demonstrate the wave shape of the walls 74A, 76A, 78A, 80A. The walls 74A, 76A, 78A, 80A may be curved (e.g., with a spatial curvature and/or a three-dimensional curved surface) so as to include one or more ridges 88A and/or one or more troughs 90A. Stated differently, the walls 74A, 76A, 78A, 80A of the hopper may be bulged, similar to the bulging of walls 12A, 14A, 16A, 18A. The wave shape of the walls 74A, 76A, 78A, 80A may function to increase the strength of the hopper 72A and reduces the necessary number of reinforcing members (e.g., reinforcing members 82A and 84A), thereby reducing welding and raw material requirements.

The horizontal reinforcing member 82A and the vertical reinforcing members 84A may be provided to further reinforcing the hopper 72A. The horizontal reinforcing member 82A at least partially surrounds and is attached to the walls 74A, 76A, 78A, 80A of the hopper 72A. The horizontal reinforcing member 82A may be similar to horizontal reinforcing member 20A in that the reinforcing member 82A may include a flange 92A having a plurality of protrusions 94A that attach to the walls 74A, 76A, 78A, 80A of the hopper 72A (e.g., via welding). The vertical reinforcing members 84A may be attached to the horizontal reinforcing member 82A and extend upward along the walls 74A, 76A, 78A, 80A of the hopper 72A. The vertical reinforcing members 84A may also comprise a flange 96A having a plurality of protrusions 98A that attach to the walls 74A, 76A, 78A, 80A of the hopper 72A (e.g., via welding).

Figure 10:
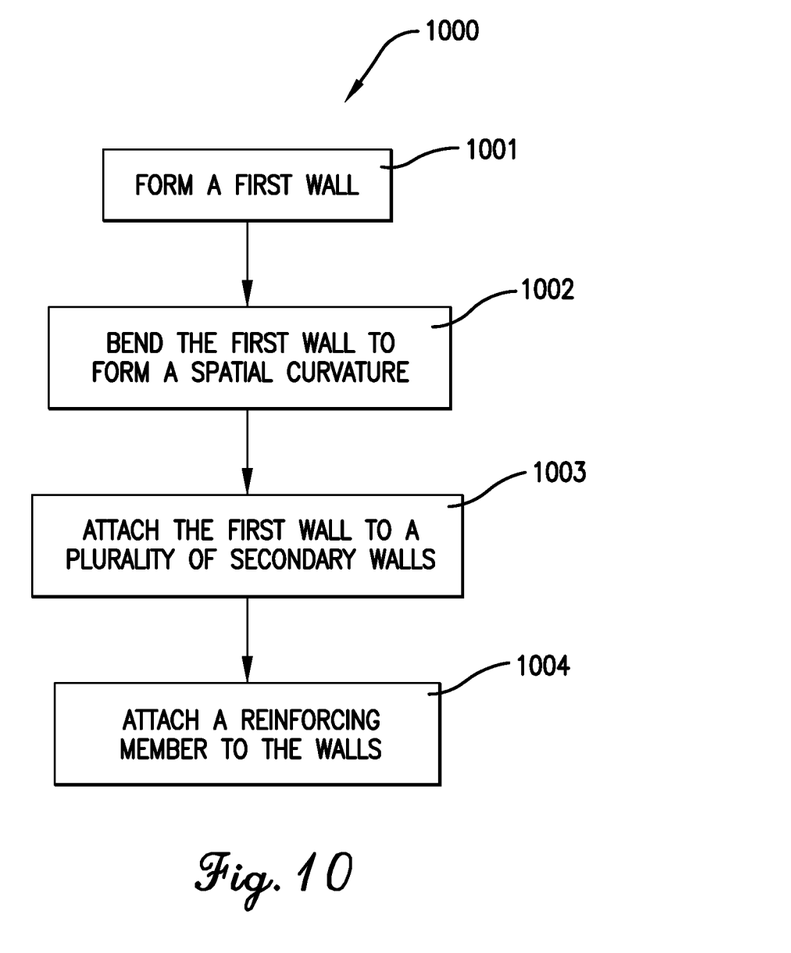
FIG. 10 is a flowchart illustrating a method for forming a filtration system housing according to embodiments of the present invention.

The flow chart of FIG. 10 depicts the steps of an exemplary method 1000 of forming a filtration system housing, such as housing 10 described above. In some alternative implementations, the functions noted in the various steps may occur out of the order depicted in FIG. 9. For example, certain steps shown in succession in FIG. 9 may in fact be executed substantially concurrently, or the steps may sometimes be executed in the reverse order depending upon the functionality involved. In addition, some steps may be optional.

Referring to Step 1001, a first wall 12 is formed having a first end 28 and a second end 36. The first wall 12 may be formed via mechanically and/or laser cutting a sheet of metal. The first wall 12 may alternatively be formed via a molding process.

Referring to Step 1002, the first wall 12 is bent or otherwise contoured into a wave shape (e.g., with a spatial curvature and/or a three-dimensional curved surface) so as to form one or more ridges 44 extending between the first end 28 and the second end 36. The wall 12 may be bent by putting pressure on one or more lateral sides of the wall 12 and/or on the ends 28, 36 of the wall 12. Alternatively, the wall 12 may be bent via gravity, mechanical operation by a machine, and/or manually by a metal fabricator. The bending may include forming a bulge in the wall 12, with the bulge being presented by the ridge 44. The wall 12 may also be bent so that the wall 12 includes multiple ridges 44 and resulting troughs 52 located between the ridges. As a result, the wall may be contoured into a wave shape that has a generally sinusoidal cross section.

Referring to Step 1003, the first wall 12 may be attached to a plurality of secondary walls 14, 16, 18 (e.g., via welding). The first walls 12 and the secondary walls 14, 16, 18 may be attached together so that they define a chamber 22 having a first opening 24 and a second opening 26. The secondary walls 14, 16, 18 may also be bent or contoured into a wave shape so as to include one or more ridges 44. This Step 1003 may additionally include forming or attaching flanges at each end of each of the walls 12, 14, 16, 18.

Referring to Step 1004, one or more reinforcing members 20 may be attached to the walls 12, 14, 16, 18 (e.g., via welding). The reinforcing member 20 may be positioned around the walls 12, 14, 16, 18, between the first and second ends of the walls 12, 14, 16, 18. The reinforcing member 20 may then be attached by welding the ends of protrusions 58 to exterior surfaces if the walls 12, 14, 16, 18. In some embodiments, only the protrusions 58 are welded to the walls 12, 14, 16, 18. In some embodiments, the reinforcing member 20 may be attached to the walls 12, 14, 16, 18 so that it is positioned at a midpoint between the first ends 28, 30, 32, 34 and second ends 36, 38, 40, 42 of the walls 12, 14, 16, 18 and/or positioned along the vertices 48 of the ridges 44 of the walls 12, 14, 16, 18.

The method 1000 may include additional, less, or alternate steps and/or device(s), including those discussed elsewhere herein. For example, the method 1000 may include a step of forming and bending one or more walls 74A, 76A, 78A, 80A and attaching them together to form the hopper 72A. The method 1000 may include attaching the hopper 72A to the walls 12A, 14A, 16A, 18A. The method 1000 may include a step of adding one or more additional reinforcing member 20, 82A, 84A.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A filtration system housing, wherein the filtration system is configured to remove particulates from air, said housing comprising:
   a plurality of walls defining a chamber for receiving pressurized air; and
   a reinforcing member at least partially surrounding said walls,
   wherein at least one of said walls is contoured to include a spatial curvature extending along a portion of said at least one wall, wherein said at least one wall is contoured in a wave shape and bulges outwardly along the spatial curvature.

2. The housing of claim 1, wherein a cross section of said at least one wall has a sinusoidal wave shape.

3. The housing of claim 1, wherein each of said walls is generally rectangular and is substantially flat at upper and lower ends, and wherein the spatial curvature of said at least one wall presents a bulging ridge that extends vertically along at least a portion said at least one wall, and wherein each of said walls comprises one or more bulging ridges extending vertically between respective upper and lower ends of said wall.

4. The housing of claim 1, wherein said reinforcing member comprises a plurality of protrusions extending inward toward said at least one wall, said protrusions being secured to an outer surface of said at least one wall.

5. The housing of claim 4, wherein said reinforcing member comprises a rectangular frame from which said protrusions extend.

6. The housing of claim 4, wherein said reinforcing member is secured to said walls by welding said protrusions to said walls.

7. The housing of claim 1, wherein said reinforcing member is positioned between upper and lower ends of said walls.

8. The housing of claim 1, wherein each of said walls includes a flange protruding from a top edge or a bottom edge of said wall.

9. The housing of claim 1, wherein said chamber is associated with an inlet for receiving the pressurized air and an outlet for removing the pressurized air.

10. The housing of claim 1, wherein said housing is configured to withstand a pressure of at least 3.1 psig.

11. A method of forming a filtration system housing, wherein the filtration system is configured to remove particulates from air, said method comprising:
  forming a first wall having a first end and a second end;
  bending the first wall to form a spatial curvature extending between the first end and the second end;
  attaching the first wall to one or more secondary walls to define a chamber; and
  attaching a reinforcing member to the first wall and to the secondary walls so that the reinforcing member is at least partially surrounding the first wall and the secondary walls.

12. The method of claim 11, wherein said step of bending the first wall comprises bending the first wall so that the first wall is at least partially contoured into a wave shape.

13. The method of claim 11, wherein the first wall bulges outward along the spatial curvature so that the first wall has a bulge vertex at a midpoint between the first end and the second end of the first wall.

14. The method of claim 13, wherein said step of attaching the reinforcing member comprises attaching the reinforcing member at the midpoint of the first wall.

15. The method of claim 11, further comprising bending each of the secondary walls so that each wall is contoured into a wave shape to include a spatial curvature extending between respective first and second ends of the wall.

16. The method of claim 11, wherein the reinforcing member comprises a plurality of protrusions extending inwardly toward the first wall, and wherein said step of attaching the reinforcing member comprises welding the protrusions to an exterior surface of the first wall.

17. The method of claim 11, further including the step of attaching a hopper to bottom ends of the first wall and the secondary walls, wherein the hopper includes at least one wall that is bent into a wave shape to form a spatial curvature extending along a portion of the wall of the hopper.

18. A filtration system housing, wherein the filtration system is configured to remove particulates from air, said housing comprising:
  a plurality of walls defining a chamber configured to receive pressurized air, wherein each of said walls is at least partially wave shaped so as to include a spatial curvature extending between ends of said wall, wherein each of said walls bulges outwardly along its respective spatial curvature; and
  a reinforcing member surrounding at least a portion of said walls and comprising—
    a plurality of protrusions extending inwardly towards said walls and secured to outer surfaces of said walls.

19. The housing of claim 18, wherein each of said walls bulges outwardly along said spatial curvature of said wall so that said wall includes a bulge vertex, and wherein said reinforcing member is attached to said walls at said bulge vertices.

* * * * *